Jan. 8, 1963
M. C. DEPP
3,071,959
METHOD OF MEASURING AND COMPENSATING FOR
DEVIATION ERROR IN COMPASS SYSTEMS
FOR MANEUVERABLE CRAFT
Filed Jan. 25, 1961
3 Sheets-Sheet 2
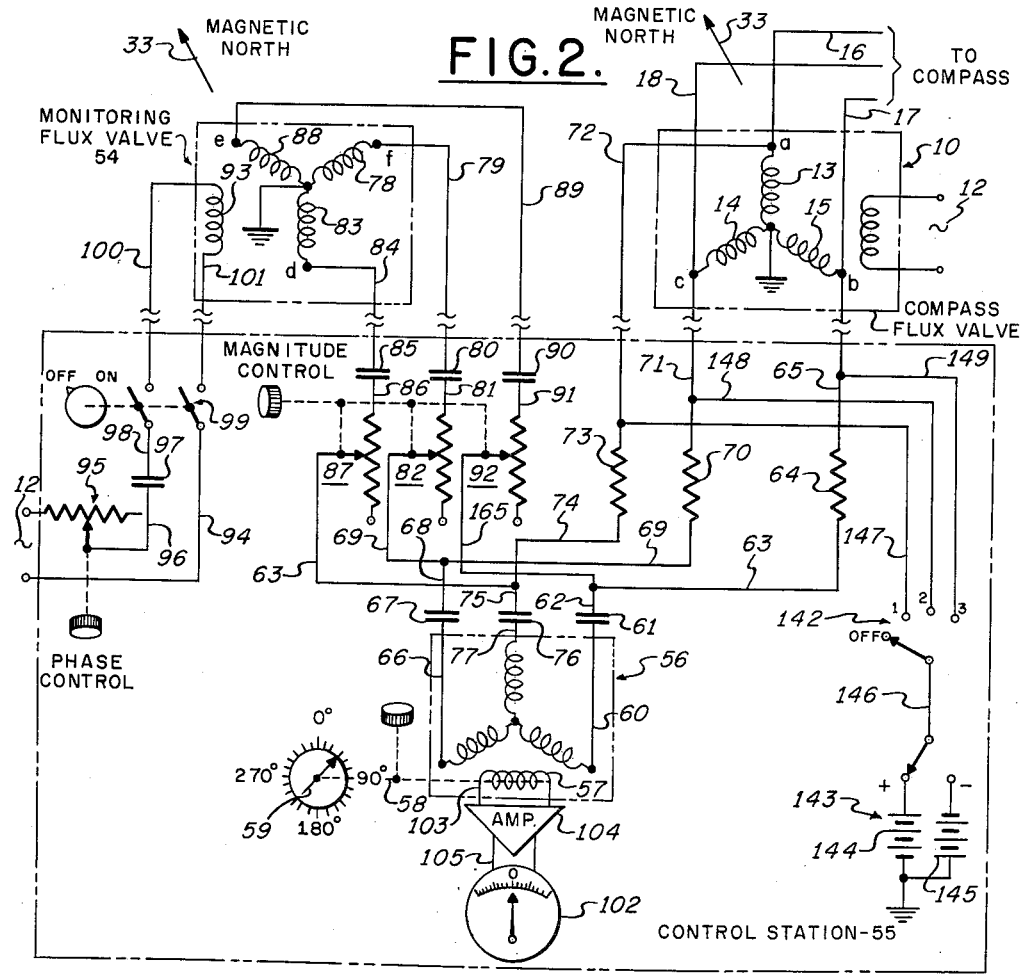
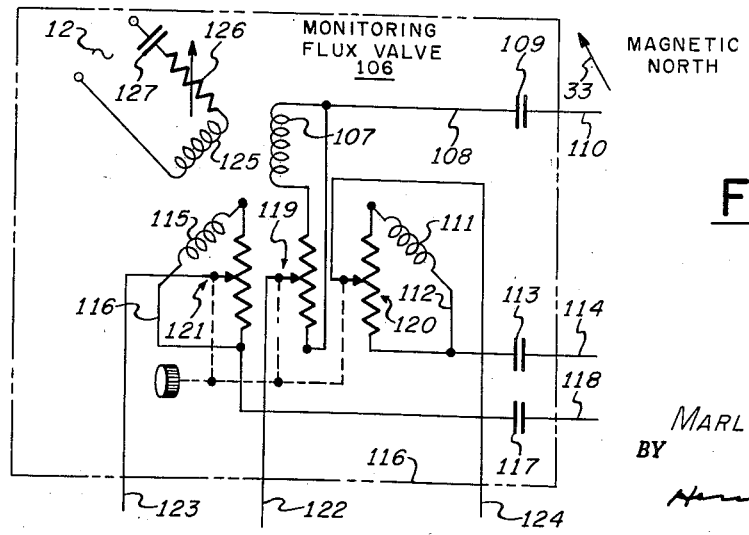
INVENTOR.
MARLIN C. DEPP
BY
ATTORNEY Jan. 8, 1963

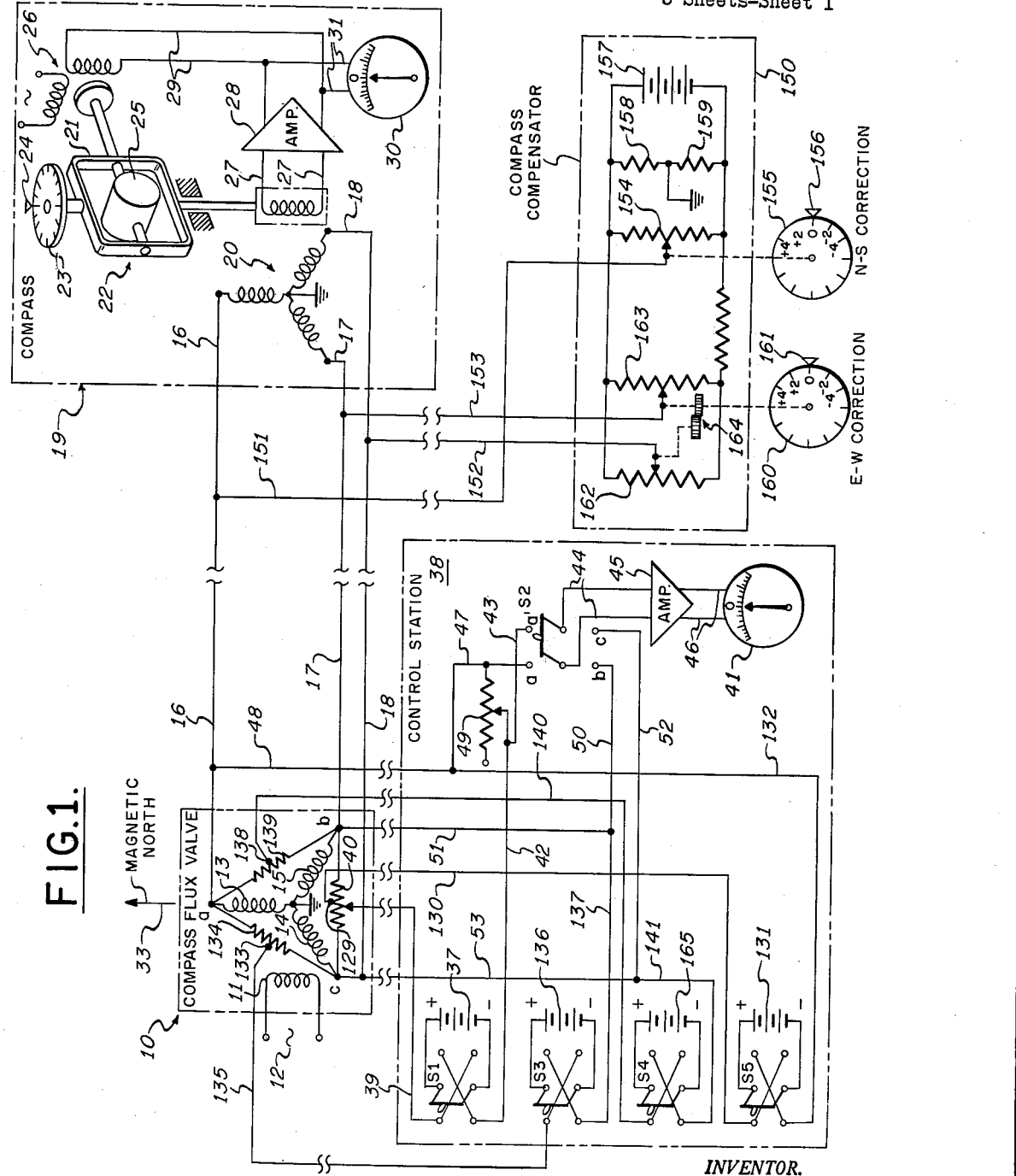

M. C. DEPP 3,071,959

METHOD OF MEASURING AND COMPENSATING FOR
DEVIATION ERROR IN COMPASS SYSTEMS
FOR MANEUVERABLE CRAFT

Filed Jan. 25, 1961

INVENTOR.
MARLIN C. DEPP
BY

ATTORNEY

United States Patent Office 3,071,959
Patented Jan. 8, 1963

3,071,959
METHOD OF MEASURING AND COMPENSATING FOR DEVIATION ERROR IN COMPASS SYSTEMS FOR MANEUVERABLE CRAFT
Marlin C. Depp, Wantagh, N.Y., assignor to Sperry Rand Corporation, Great Neck, N.Y., a corporation of Delaware
Filed Jan. 25, 1961, Ser. No. 84,921
12 Claims. (Cl. 73—1)

This invention relates to a method of measuring and compensating for deviation error in compass systems for maneuverable craft of the flux valve type that obtain directivity from the horizontal component of the earth's magnetic field. The invention has particular utility in earth's field responsive flux valve compass systems of the types shown and described in U.S. Letters Patent No. 2,357,319, dated September 5, 1944, for Flux Valve Magnetic Compasses and U.S. Letters Patent No. 2,427,654, dated September 23, 1947, for Remote Reading Flux Valve Compass Systems.

One of the present methods utilized to calibrate such compass instruments for deviation error requires the actual swinging of the craft with respect to the earth to known magnetic headings through an azimuth range of 360 degrees. Another method is presently practiced that does not require the craft to change its position with relation to the earth in which the compass is swung electrically as disclosed in U.S. Letters Patent No. 2,887,872, dated May 26, 1959, for Method of Measuring and Compensating for Deviation Errors in Earth's Field Responsive Instruments and in U.S. Letters Patent No. 2,887,873, dated May 26, 1959, for Method of Measuring and Compensating for Deviation Errors in Earth's Field Sensitive Direction Indicators. In accordance with the swinging procedure disclosed in the noted patents, it is necessary to electrically ground swing the earth's field sensitive element or flux valve of the compass system apart from the craft to provide a directive field equivalent of the earth's field for each of a plurality of observed azimuth directions through the setting of a plurality of electrical controllers. Each of the directive fields is the resultant of a fixed earth's field at the orientation of the element or flux valve apart from the craft, and the field created at the element or valve by the setting of the controllers to indicate a particular heading on the compass. In order to duplicate the resultant or direction indicating field conditions with the sensitive element or flux valve fixedly oriented in the craft, this method also requires that a record be made of the individual settings of the respective controllers for each of the simulated earth's field directions. Also in the practice of the electrical ground swinging step of the described method, the settings of the controllers is duplicated from the provided record to reproduce the resulting field conditions under which the record was made with the flux valve oriented in the craft. Departures from the compass directions established by each of the settings of the controllers is then observed on the card of the compass as the deviation error for a particular reading. The accuracy of this method is dependent on human precision in both preparing the ground swinging record with its many individual controller settings as well as in duplicating the settings of the controllers in the electrical ground swinging step of the procedure. An object of the present invention is to provide an improved electrical ground swinging method for flux valve compass systems in which the flux valve is not swung apart from the craft to prepare the record required in the described method and in which the human precision requirement has accordingly been reduced to a minimum to improve the accuracy of the results.

The improved method further removes the complication provided by the continued presence on the compass system of the influence of the earth's magnetic field on the flux valve in all of the steps of the considered method. The practice of providing control fields at the valve that combine with the earth's magnetic field to produce directive resultant fields in the recording and swinging steps of the known method are also eliminated.

In accordance with the teaching of the present invention, the influence of the earth's magnetic field on the flux valve of the system is cancelled in the calibrating step of the method by nulling the output of the valve electrically, the valve being oriented with respect to but apart from the craft in which it is used. The compass swinging step of the improved method is then accomplished electrically apart from the influence of the earth's magnetic field on the valve with the calibrated valve located in the craft. The deviation error is observed in the improved method on the card of the compass as a measure of the output of the valve at each of the simulated angular displacements of the craft provided in the electrical swinging step. With the valve remaining calibrated, the deviation errors observed on the compass card in this step of the method are caused by the influence on the valve of a resultant local disturbing field on the craft for the fixed heading of the craft and for each of the electrically simulated headings of the craft.

The deviation field in the improved method is measured apart from the earth's magnetic field which is cancelled at the flux valve. The resultant deviation field is dependent on the location of the disturbing sources that create electric or magnetic fields on the craft and the relative strength of the individual sources. The effect of this field in relation to the valve during electrical ground swinging of the craft is the same as it would be if the craft were physically moved through an azimuth range of 360 degrees. Deviation is herein defined as the angular difference between magnetic heading and the heading on the card of the compass of the card due to local influence of electrical or magnetic fields on the craft in the vicinity of the flux valve. Various sources of such disturbing local fields carried by a maneuverable craft of any type include permanently magnetized portions of the body structure of the craft, the engine and associated equipment for moving the craft, general electrical equipment carried by the craft such as power generators, radio transmitters and receivers and other known devices that operate to provide a magnetic or electric field.

Other objects, advantages and practices of the improved method will become apparent in the following description of the subject invention in relation to the accompanying drawings, wherein, FIG. 1 is a schematic view and wiring diagram of a flux valve compass system in which the card of the compass is controlled by a slaved directional gyro showing the other electrical components utilized therewith in the practice of the improved method.

FIG. 2 is a view similar to FIG. 1 showing a modified form of the improved method in which a monitoring flux valve is utilized in the system to calibrate the valve.

FIG. 3 is a detail view of a modified form of monitoring flux valve component useable in the monitoring type system shown in FIG. 2.

Figure 5:
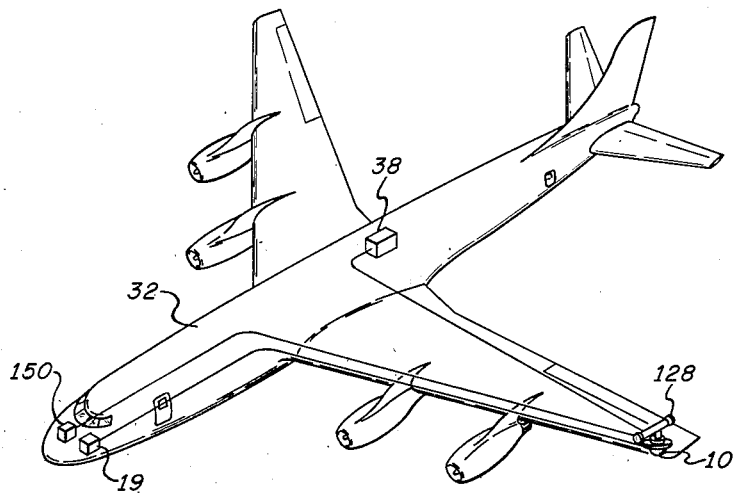
FIG. 5 is a representation of the components used in the practice of the method arranged in a maneuverable craft such as an aircraft with the calibrated valve fixed mounted in the craft as required on the electrical compass swinging steps.

The earth's field sensitive element of the flux valve compass system shown in FIGS. 1 and 2, is provided by a three legged flux valve designated as a compass flux valve 10. As shown, the primary coil 11 of the valve 10 is energized from a suitable source of alternating current electrical energy 12. The secondary coils 13, 14 and 15 on the respective one hundred and twenty degree spaced flux conducting legs of the valve 10 provide a controlling output dependent on the valves position in azimuth in the earth's magnetic field. As shown in FIG. 1, the output of the valve 10 is fed by way of leads 16, 17 and 18, connected to the secondary coils 13, 14 and 15, respectively, to a remotely located slaved directional gyro with a compass card of the type shown and described in U.S. Letters Patent No. 2,357,319, dated September 5, 1944, for Flux Valve Magnetic Compasses and herein designated as compass 19. The compass 19 functions as a repeater whose structure includes an electrical comparator 20 with a rotor connected to an extension of the lower trunnion of the vertical ring 21 of a directional gyro 22. The upper trunnion of the ring 21 supports a movable compass card 23 that is read by an observer in relation to a suitable lubber line or index 24 fixed to the craft. The directional gyro includes a rotor case 25 that is torqued about its horizontal axis of support in ring 21 by a suitable torque motor 26. The conrtol winding of the torque motor 26 of the system is energized by the output of the rotor of the comparator 20 by way of leads 27, amplifier 28 and leads 29 so as to normally precess the rotor case 25 about its ring axis until a null signal is obtained from the rotor of the comparator 20. Leads 16, 17 and 18, are connected to the respective windings of the stator of the comparator 20. Leads 16, 17 and 18 are connected to the respective windings of the stator of the comparator 20 to slave the compass 19 from the output of the valve 10 so that the card 23 with relation to index 24 provides an indication of the azimuth position of the craft utilizing the flux valve compass system. A zero center null meter 30 may be included in the system to provide an indication of the output of the comparator 20. As shown, meter 30 is operated by the output of the amplifier 28 by way of leads 31 that connect with the leads 29 to the torque motor 26. As shown in FIG. 5, with relation to a craft such as an aircraft 32, the flux valve 10 of the described system is preferably located in a suitable position in one of the wings of the craft so as to be as remote as possible from sources causing deviation error. The compass component 19 of the system, electrically connected to the valve 10 by the leads 16, 17 and 18 which are shielded, is generally located on the instrument panel in the bow portion of the cabin of the aircraft directly in front of the pilot's seat.

Figure 4:
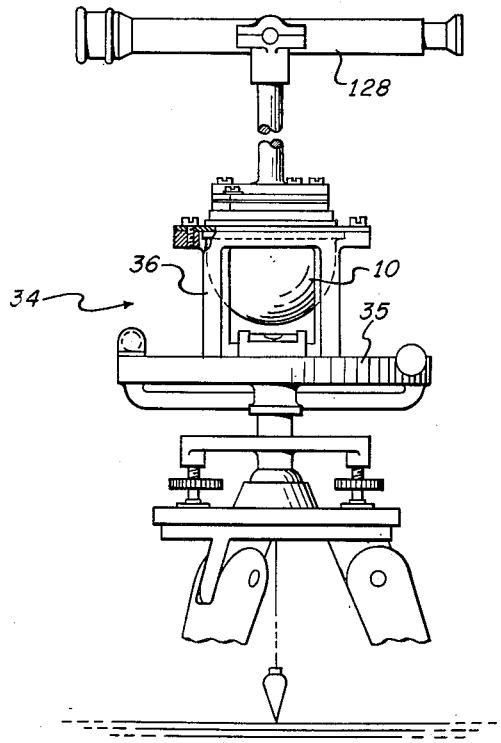
FIG. 4 is a side elevation of a transit instrument providing a flux valve mounting useable in the orienting and locating steps of the improved method.

The initial step of the improved method consists in orienting the flux valve 10 in the earth's magnetic field apart from the craft. As shown in FIG. 1, the valve may be oriented in a magnetic north direction where the arrow 33 indicates magnetic north. Orientation may be accomplished with the use of a suitable transit 34, FIG. 4, having a level trim table 35 thereon with a mounting plate 36 for the valve 10. In the performance of this step, the turntable 35 is adjusted manually about its vertical axis until the compass card 23 reads zero degrees heading on the index 24 of compass 19 where the orientation derived is magnetic north as indicated in FIG. 1. The valve 10 of the system may also be oriented to correspond to the heading of the craft in which the valve is to be used where the heading of the craft is known. Such orientation is illustratively shown in FIG. 2 by the relative angular displacement between the arrow 33 indicating magnetic north and the secondary coils of the valve component 10. In orienting the valve 10 in FIG. 2 in accordance with the known heading of the craft, the turntable of the transit 34 with the valve 10 mounted thereon is adjusted manually in azimuth until the card of the compass improvement of the system is moved with relation to its index to indicate the known heading of the craft. To maintain the orientation of the valve 10 in the earth's magnetic field that is desired, the turntable 35 of the transit is locked about its vertical axis. This step of the improved method is conducted in an open field location, such as an airport, that is as far removed from any local magnetic disturbance as possible. Any region of minimum magnetic disturbance for the earth's magnetic field into which the craft may be conveniently moved is useful for this purpose. The locale in which the method is practiced is relatively free of any outside magnetic disturbances.

In the following step of the improved method the output of the valve 10 at its chosen orientation in the earth's magnetic field is nulled electrically to accomplish the calibrating step. In this step, the influence of the valve 10 of the system as responsive to the earth's magnetic field is completely removed from the compass companent 19. With the valve 10 oriented and calibrated in accordance with the present concepts, the subsequent steps of the method may be considered to be obtained in a locale that is completely free of the earth's magnetic field and in which only the disturbing deviation field of the craft is present. The electrical swinging and deviation observing steps of the method are accordingly accomplished apart from the influence of the earth's magnetic field.

The components utilized in the form of the invention shown in FIG. 1 to calibrate the valve 10 of the system produce a field that cancels the earth's magnetic field at the valve by introducing direct current to its windings or coils 13, 14 and 15. As shown in this figure, the direct current electrical source is provided by a battery 37 at a control station system component 38 that is located at a distance from the valve 10. The battery 37 is shown connected to the flux valve 10 by way of reversing switch S1 and lead 39 to the slider of a potentiometer 40 located across the valve output leads 17 and 18 at the valve terminals $b$ and $c$. At the control station 38, switch $S^1$ is also connected to a nullmeter 41 by way of lead 42, connecting lead 43 to terminal $a'$ of reversing switch S2, leads 44 to amplifier 45 and amplifier output leads 46. The terminal $a$ side of the switch S2 is connected to the output lead 16 of the valve 10 at valve terminal $a$ through lead 47 and connecting lead 48. The voltage of the battery 37 across the valve 10 is adjusted by a potentiometer 49 connected across leads 47 and 42. For convenience, this potentiometer may be provided with a scale in terms of geomagnetic latitude. The switch S2 terminal $b$ is connected to the valve terminal $b$ by way of leads 50 and 51. The switch S2 terminal $c$ is also connected to the valve terminal $c$ by way of leads 52 and 53.

To calibrate the valve 10 with the provided orientation S1 is closed so that the positive terminal of battery 37 is connected to valve terminal $a$ and switch S2 is closed to connect the nullmeter 41 across valve terminals $b$ and $c$. Potentiometer 44 is set to the approximate geomagnetic latitude. The slider of the potentiometer 40 across valve terminals $b$ and $c$ is now adjusted to null out any east-west component of the earth's magnetic field in the output of the valve. Where, as shown, the valve 10 is oriented in a northerly direction in the earth's field, the meter 41 will read null when the slider is adjusted approximately to divide the resistance of the potentiometer equally between the valve terminals $b$ and $c$. Switch S2 is then closed with the meter 41 across its terminals $a$ and $a'$ and the slider of potentiometer 49 is adjusted to null out the north-south component of the earth's magnetic field. At the completion of the calibrating step, it is not necessary to make a record of the setting of the potentiometer 40 at the valve 10 or the settings of the switch S1 and potentiometer 49 at the control station as these circuit elements remain as conditioned for the remainder of the procedure. In the described circuitry, the same calibrating procedure would be repeated with switch S1 closed to connect the negative end of battery 37 to the flux valve terminal *a* if the valve 10 were directed in a southerly direction in the earth's magnetic field.

The calibrating step of the procedure may also be performed as shown in FIG. 2 by connecting a monitoring flux valve 54 in electrical opposition to the compass flux valve 10. In the circuitry shown in this figure, a control station 55 includes a compass repeater 56 with a comparator identical to element 20 of compass component 19 whose rotor 57 is connected by a controllable shaft 58 to position the movable pointer 59 of a compass whose azimuth dial is fixed. In the arrangement illustrated, one of the legs of the stator of the repeater 56 of the station 55 is connected to the compass flux valve 10 by way of lead 60, blocking capacitor 61, lead 62, lead 63, resistor 64 and lead 65 to the valve terminal *b*. Another leg of the stator is connected to the valve terminal *c* by way of lead 66, blocking capacitor 67, lead 68, lead 69, resistor 70 and lead 71. The valve terminal *a* is also connected to the third leg of the stator of the repeater 56 by way of lead 72, resistor 73, lead 74, lead 75, blocking capacitor 76 and lead 77. In the described arrangement in FIG. 2, the orienting step of the method is performed with valve 10 on the transit 34 apart from the craft and distant from station 55. Where the valve 10 is oriented in accordance with the known heading of the craft as represented in FIG. 2, the valve 10 is turned in azimuth on the turntable 35 of the transit 34 until the pointer 59 indicates the correct heading of the craft in the azimuth dial at the control station 55. The valve 10 is then locked in its oriented direction in the earth's magnetic field at the turntable 35 of the transit. In the arrangement of components shown in FIG. 2, the monitoring valve 54 as a separate component is mounted on the turntable of a second transit like transit 34 and located in the earth's magnetic field apart from the craft and also distant from the station 55.

With the compass valve 10 disconnected from the station 55, the connected monitoring valve 54 is oriented in the earth's magnetic field in 180 degree out of phase relation with the compass valve in the manner described for the orientation of the compass valve in connection with the compass repeater 56. In FIG. 2, a secondary coil or winding 78 of monitoring valve 54 is connected at its terminal *f* to the stator of repeater 56 by way of lead 79, blocking capacitor 80, lead 81, potentiometer 82, connecting lead 69, lead 68, capacitor 67 and lead 66. Secondary coil 83 of the valve 54 is connected at its terminal *d* to the repeater 56 by way of lead 84, blocking capacitor 85, lead 86, potentiometer 87, connecting lead 63, lead 75, capacitor 76 and lead 77. The further secondary coil 88 of the valve 54 is connected at its terminal *e* to the stator of the repeater 56 by way of lead 89, blocking capacitor 90, lead 91, potentiometer 92, the connecting lead 165, lead 62, capacitor 61 and lead 60. In FIG. 2, energy from the alternating current source 12 at the control station 55 is supplied to excite the primary coil 93 of the monitoring valve 54 by way of lead 94, the phase control potentiometer 95, lead 96, capacitor 97, lead 98, an off-on switch 99 and leads 100 and 101. The potentiometers 82, 87 and 92 are ganged so that the sliders thereof are controlled from a single knob to provide control of the magnitude of the voltage output of the valve 54. In the orientation procedure for valve 54, the turntable of the transit on which it is mounted in the earth's magnetic field is adjusted in azimuth manually until the pointer 59 provides an indication on the compass dial of the repeater that it is oriented in 180 degree out-of-phase relation to the compass valve 10. The secondary coils of the respective flux valves are represented in FIG. 2 as described with relation to the arrow 33 designating magnetic north. The calibration step for the arrangement of components provided in FIG. 2 is completed when both valves 54 and 10 are connected to the station 55, with energy supplied from the source 12 at the station 55 and the phase control potentiometer 95 and magnitude control potentiometers 82, 87 and 92 adjusted so that there is a null output from the rotor of the repeater rotor 57. This is read by observing the pointer and scale of a nullmeter 102 of the character of compass meter 30 that is connected to the repeater rotor 57 by way of leads 103, amplifier 104 and leads 105. Ambient change in the earth's magnetic field is automatically compensated for where a monitoring flux valve is used in the system with the compass flux valve and the valves are connected as required in the calibrating step of the improved method.

The method may also be practiced with the use of a monitoring flux valve having coils connected in reverse relation to the coils 13, 14 and 15 of the compass valve 10 and with the respective valves connected in series. A monitoring valve of this character is indicated at 106, in FIG. 3. Coil or winding 107 of valve 106 is connected by lead 108, blocking capacitor 109 and lead 110 to the compass valve terminal *a*. Coil 111 of valve 106 is connected to the *b* terminal of the compass valve 10 by way of lead 112, capacitor 113 and lead 114. Coil 115 of valve 106 is also connected to the compass valve 10 at terminal *c* by way of lead 116, capacitor 117 and lead 118. The capacitors 109, 113 and 117 located at the valve component 106 in FIG. 3 are the equivalent of the blocking capacitors 90, 85 and 80 located at the control station 55 in FIG. 2. The equivalent of the magnitude control potentiometers 87, 82 and 92 in the control station 55 of FIG. 2 is provided at the valve component 106 in FIG. 3 by the ganged potentiometers 119, 120 and 121. The potentiometers 119, 120 and 121 as represented in FIG. 3 are arranged in parallel relation to the respective coils 107, 111 and 115 of the valve 106. The valve 106 is also connected to the stator of the repeater 56 in FIG. 2 by way of potentiometer 119 and lead 122 from coil 107, potentiometer 121 and lead 123 from coil 115, and potentiometer 120 and lead 124 from coil 111, the connections being made thereat at the terminals corresponding to the coil terminals *a*, *c* and *b* respectively of the compass valve 10. In the arrangement provided in FIG. 3, the valve 106 is directly connected to the alternating current source 12 rather than being so supplied from control station 55. The phase control potentiometer located at station 55 for the monitoring valve in FIG. 2 is also located at the valve component 106 in FIG. 3. The input circuit to the primary coil 125 of valve 100 accordingly includes a phase control potentiometer 126 and capacitor 127. In the orienting step of the method, valve 106 is oriented in the earth's magnetic field apart from the valve 10 in a manner similar to that described for the monitoring valve 54. With the monitoring valve 106 mounted on the turntable of a transit like transit 34, the table is adjusted manually until the compass repeater 56 indicates that its orientation corresponds with that of the compass valve 10. This is represented in FIG. 3 by the relative angular displacements of the coils of the valve 106 with regard to the arrow 33 indicating magnetic north which corresponds to the position of the compass valve 10 in FIG. 2. With the orientation of valve 106 completed independently of valve 10, the calibrating step is completed by electrically connecting the valves and adjusting the phase potentiometer 126 and magnitude potentiometers 119, 120 and 121 until the meter 102 at the control station reads null.

Where the valve is not initially oriented and calibrated in the earth's magnetic field with regard to the craft as in the practice of the method indicated in FIG. 1, the next step in the procedure is to orient the craft in the earth's field to correspond to the orientation of the compass valve. This may be accomplished by aligning the longitudinal axis of the craft and the valve 10 along a common line of sight on a distant object, the line having the orientation in the earth's field of the valve 10 by the use of a telescope 128 on the transit 34 having the valve 10 thereon and a similar telescope on the craft whose sighting axis corresponds to or is parallel to the craft's longitudinal axis. This step is unnecessary where the heading of the craft is known and the valve 10 is oriented in accordance with the known heading as indicated in FIG. 2.

The next step of the method consists in locating the calibrated valve 10 in its oriented direction on the oriented craft. This may be accomplished as indicated in FIG. 5 by transferring the valve 10 from its mounting 36 on transit 34 to the wing of the craft 32 with the telescope 128 directed on the object sighted in the previous step. With the valve 10 mounted on the craft in its oriented direction in the earth's magnetic field, the telescope 128 is removed from the housing of the valve to complete this step of the method.

With the compass 19 now connected as shown in FIG. 5, to either the craft mounted valve 10 of FIG. 1, the craft mounted valve 10 of FIG. 2 and either of the oriented monitoring valves 54 or 106, and either control station 38 or 55, the system is conditioned for the craft ground or electrical compass swinging step of the improved method. This step of the method is accomplished entirely apart from the influence of the earth's magnetic field on the calibrated compass valve 10 of FIGS. 1 and 2 and its resultant control of compass 19 of the system. This is due to the fact that the influence of the earth's magnetic field in the system has been cancelled at the completion of the calibrating step of the method in accordance with one of the calibrating practices heretofore described. In swinging the compass electrically to simulate a ground swing of the craft in accordance with the practice of the improved method, the windings or coils of the calibrated compass valve are energized to provide a plurality of directive fields for each of a plurality of simulated angular displacements of the craft with relation to the earth's magnetic field. This is accomplished electrically by utilizing the 120 degree angularly displaced coils or windings of the compass valve independently so that each produces two oppositely directed electrical fields. The other windings are energized accordingly so that the three coils or windings of the valve produce a total of six directive electrical fields of known orientation with relation to the earth's magnetic field in the swinging step of the method.

In the form of the orientation shown in FIG. 1, the swinging step is accomplished by introducing direct current to the windings 13, 14 and 15 of the valve 10 under control of an operator at the control station 38. The circuitry provided for this purpose for the control coil or winding 13 of the valve 10 includes a center tap connection 129 to the resistance component of potentiometer 40 between valve terminals b and c, a lead 130 to a polarity reversing switch S5, battery 131 and lead 132 to the terminal a of the valve 10. With switch S5 closed to connect the positive terminal of the battery 131 to the valve terminal a, coil 13 is energized to produce an electrical field at the valve that is the equivalent of the earth's magnetic field. The compass 19 of the system responds to the output to move card 23 relative to index 24 to indicate a 0 degrees heading of the craft. Any departure from this condition is due to the influence of a local disturbing field on the craft. Accordingly, the deviation error is directly observed on the compass as a measure of the output of the valve for the simulated zero degree displacement of the craft in relation to the earth's magnetic field. The step is continued by reversing the switch S5 to change the polarity of the battery 131 in relation to the control coil 13 so that the simulated displacement of the craft corresponds to a heading of 180 degrees. Deviation at this simulated heading of the craft is observed on the compass 19 as the angular departure from a 180 degree reading of the card 23 with relation to the index 24. In the described circuitry the effective fields of the coils 14 and 15 are in balance and accordingly have no directive effect on the output of the valve. Simulated craft displacements of 120 degrees and 300 degrees are obtained by energizing the coil 15 of the valve 10 as the control coil by circuitry including a center tap connection 133 to a resistor 134 across the valve terminals a and c, lead 135, reversing switch S3, battery 136, lead 137 to lead 51 and the b terminal of the valve 10. Further simulated craft displacements of 240 degrees and 60 degrees are obtained by energizing the coil 14 of the valve 10 as the control coil by circuitry including a center tap connection 138 to a resistor 139 across the valve terminals a and b, lead 140, reversing switch S4, battery 165 and lead 141 to lead 53 and the c terminal of the valve. At each of the 60 degree displaced headings simulated by the craft in the compass swinging step under control of an operator at the control station 38, any error observed is due to the effect on the valve of the local disturbing fields of the craft and is accordingly a measure of the deviation error. The method accordingly includes an observing step in which the deviation error of the system is observed on the compass as a measure of the output of the compass valve at each of the simulated angular displacements of the craft.

In the form of the invention utilizing a monitoring flux valve such as the valve 54 in FIG. 2 or the valve 106 in FIG. 3, the compass swinging step is accomplished by introducing current to the windings or coils 13, 14 and 15 of the monitored compass flux valve 10 for each of a plurality of simulated angular displacements of the craft with relation to the earth's magnetic field. As monitored, the magnetic north field indicated by arrow 33 in FIG. 2 does not influence the output of the valve 10. The 60 degree angularly displaced positions of the card 23 and the index 24 of compass 19 are obtained as shown in FIG. 2 by a three position switch 142 and a two position switch 143 under control of an operator at station 55. The circuitry provided to energize coil 13 includes one of the batterys 144 or 145, switch 143, lead 146, the 1 position of switch 142, and lead 147 to the terminal a connecting lead 72. The valve coil 14 is energized when the switch 142 is set in the second position of the switch 142 by way of lead 148 and the connecting lead 71 to the valve terminal c. For the other two swinging positions of the card 23, the switch 142 is connected to the valve coil 15 at terminal b in its third position by way of lead 149 and lead 65. Switch 143 is provided to reverse the polarity of the excitation of the respective valve coils which in the circuitry provided function independently of one another so that with coil 13 energized positively the card 23 should indicate the known heading of the craft. Any departure from the reading is the result of the influence of a disturbing local field on the craft and is accordingly observed on the compass as a measure of the deviation error of the system. As the respective switches 142 and 143 are operated the compass swinging step of the method is completed with each displacement being with respect to the known heading of the craft and with respect to the earth's magnetic field according to the orientation indicated in FIG. 2.

Where the system includes a deviation compensator such as indicated at 150 in FIG. 1, the described steps of the improved method are performed with the compensator set in a non-correcting condition. The illustrated compensator 150 functions to energize the windings of the compass valve so as to adjust resultant field sensed by the valve and accordingly directly compensate the system for the deviation error. As shown in FIG. 1, the magnetic fields at the valve 10 required to compensate for the observed error are obtained by proper adjustment of the magnitude and polarity of direct current supplied thereto from the compensator 150 by way of connecting leads 151, 152 and 153. Lead 151 connects the valve terminal a by way of lead 16 to the slider of a potentiometer 154. A north-south corrector knob 155 shown set in zero position with relation to index 156 controls the adjustment of the slider of the potentiometer 154 that is located in a bridge circuit energized by battery 157 and includes resistors 158 and 159. Movement of the knob 155 with relation to the index 156 unbalances the bridge and determines the magnitude and polarity of the compensating current supplied the valve by way of lead 151. An east-west correction knob 160 and index 161 is included in the compensator 150 to control the magnitude and polarity of the current to the valve 10 supplied by way of leads 152 and 153. The sliders of the respective potentiometers 162 and 173 connected to the leads 152 and 153 are moved differentially by the knob 160 through a suitable reversing gear connection 164. The potentiometer 162 and 163 provides a bridge circuit energized by battery 157 that is unbalanced by movement of the knob 160 away from its zero index position to provide the necessary east-west compensating correction for deviation. In the practice of the method, the deviation compensator is set by proper adjustment of the knob 155 for the north-south correction and proper adjustment of the knob 160 for east-west correction in accordance with the observed deviation error.

The swinging step of the improved method may be practiced with the control station 34 or 55 located aboard the craft 32 as indicated in FIG. 5. Where the system includes a deviation compensator of a different type than shown in FIG. 2, the compensator is removed from the vicinity of the compass valve 10 until after the observing step of the method is completed.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A method of measuring deviation error in a flux valve compass system for maneuverable craft which consists in orienting the flux valve of the system apart from the craft in a desired direction in the earth's magnetic field, calibrating the oriented valve by nulling its output electrically to cancel the influence of the earth's magnetic field thereon, orienting the craft in the earth's magnetic field to correspond to the orientation of the flux valve, locating the calibrated valve in its oriented direction on the oriented craft, electrically compass swinging the craft by energizing the windings of the calibrated valve to provide a plurality of directive fields apart from the influence of the earth's magnetic field for each of a plurality of simulated angular displacements of the craft with relation to the earth's magnetic field, and observing the deviation error of the system on the compass as a measure of the output of the valve at each of the simulated angular displacements of the craft.

2. A method of measuring deviation error in a flux valve compass system for maneuverable craft which consists in orienting the flux valve of the system apart from the craft in a direction in the earth's magnetic field according to a known heading of the craft, calibrating the oriented valve by nulling its output electrically to cancel the influence of the earth's magnetic field thereon, locating the calibrated valve in its oriented direction on the craft, electrically compass swinging the craft by energizing the windings of the calibrated valve to provide a plurality of directive fields apart from the influence of the earth's magnetic field for each of a plurality of simulated angular displacements of the craft with relation to the earth's magnetic field, and observing the deviation error of the system on the compass as a measure of the output of the valve at each of the simulated angular displacements of the craft.

3. A method of correcting for deviation error in a flux valve compass system for maneuverable craft with a settable deviation compensator which consists in orienting the flux valve of the system apart from the craft in a desired direction in the earth's magnetic field with the compensator set in a non-correcting condition, calibrating the oriented valve by nulling its output electrically to cancel the influence of the earth's magnetic field thereon, orienting the craft in the earth's magnetic field to correspond to the orientation of the flux valve, locating the calibrated valve in its oriented direction on the oriented craft, electrically compass swinging the craft by energizing the windings of the calibrated valve to provide a plurality of directive fields apart from the influence of the earth's magnetic field for each of a plurality of simulated angular displacements of the craft with relation to the earth's magnetic field, observing the deviation error of the system on the compass as a measure of the output of the valve at each of the simulated angular displacements of the craft, and setting the deviation compensator in accordance with the observed deviation error.

4. A method of correcting for deviation error in a flux valve compass system for maneuverable craft with a settable deviation compensator which consists in orienting the flux valve of the system apart from the craft in a direction in the earth's magnetic field according to a known heading of the craft with the compensator set in a non-correcting condition, calibrating the oriented valve by nulling its output electrically to cancel the influence of the earth's magnetic field thereon, locating the calibrated valve in its oriented direction on the craft, electrically compass swinging the craft by energizing the windings of the calibrated valve to provide a plurality of directive fields apart from the influence of the earth's magnetic field for each of a plurality of simulated angular displacements of the craft with relation to the earth's magnetic field, observing the deviation error of the system on the compass as a measure of the output of the valve at each of the simulated angular displacements of the craft, and setting the deviation compensator in accordance with the observed deviation error.

5. A method of measuring deviation error in a flux valve compass system for maneuverable craft which consists in orienting the flux valve of the system apart from the craft in a desired direction in the earth's magnetic field, producing a field that cancels the earth's magnetic field at the oriented valve by introducing direct current to its windings to thereby calibrate the valve, orienting the craft in the earth's magnetic field to correspond to the orientation of the flux valve, locating the calibrated valve in its oriented direction on the oriented craft, producing a plurality of directive fields by introducing direct current to the windings of the calibrated valve for each of a plurality of simulated angular displacements of the craft with relation to the earth's magnetic field to swing the compass electrically apart from the influence of the earth's magnetic field, and observing the deviation error of the system on the compass as a measure of the output of the valve at each of the simulated angular displacements of the craft.

6. A method of measuring deviation error in a flux valve compass system for maneuverable craft which consists in orienting the flux valve of the system apart from the craft in a direction in the earth's magnetic field according to a known heading of the craft, producing a field that cancels the earth's magnetic field at the oriented valve by introducing direct current to its windings to thereby calibrate the valve, locating the calibrated valve in its oriented direction on the craft, producing a plurality of directive fields by introducing direct current to the windings of the calibrated valve for each of a plurality of simulated angular displacements of the craft with relation to the earth's magnetic field to swing the compass electrically apart from the influence of the earth's magnetic field, and observing the deviation error of the system on the compass as a measure of the output of the valve at each of the simulated angular displacements of the craft.

7. A method of correcting for deviation error in a flux valve compass system for maneuverable craft with a settable deviation compensator which consists in orienting the flux valve of the system apart from the craft in a desired direction in the earth's magnetic field with the compensator set in a non-correcting condition, producing a field that cancels the earth's magnetic field at the oriented valve by introducing direct current to its windings to thereby calibrate the valve, orienting the craft in the earth's magnetic field to correspond to the orientation of the flux valve, locating the calibrated valve in its oriented direction on the oriented craft, producing a plurality of directive fields by introducing direct current to the windings of the calibrated valve for each of a plurality of simulated angular displacements of the craft with relation to the earth's magnetic field to swing the compass electrically apart from the influence of the earth's magnetic field, observing the deviation error of the system on the compass as a measure of the output of the valve at each of the simulated angular displacements of the craft, and setting the deviation compensator in accordance with the observed deviation error.

8. A method of correcting for deviation error in a flux valve compass system for maneuverable craft with a settable deviation compensator which consists in orienting the flux valve of the system apart from the craft in a direction in the earth's magnetic field according to a known heading of the craft with the compensator set in a non-correcting condition, producing a field that cancels the earth's magnetic field at the oriented valve by introducing direct current to its windings to thereby calibrate the valve, locating the calibrated valve in its oriented direction on the craft, producing a plurality of directive fields by introducing direct current to the windings of the calibrated valve for each of a plurality of simulated angular displacements of the craft with relation to the earth's magnetic field to swing the compass electrically apart from the influence of the earth's magnetic field, observing the deviation error of the system on the compass as a measure of the output of the valve at each of the simulated angular displacements of the craft, and setting the deviation compensator in accordance with the observed deviation error.

9. A method of measuring deviation error in a flux valve compass system for maneuverable craft which consists in orienting the flux valve of the system apart from the craft in a desired direction in the earth's magnetic field, producing a field that cancels the earth's magnetic field at the oriented valve by connecting a monitoring flux valve to the compass flux valve in electrical opposition to thereby calibrate the compass valve, orienting the craft in the earth's magnetic field to correspond to the orientation of the flux valve, locating the calibrated valve in its oriented direction on the oriented craft, producing a plurality of directive fields by introducing direct current to the windings of the monitored compass flux valve for each of a plurality of simulated angular displacements of the craft with relation to the earth's magnetic field to swing the craft electrically apart from the influence of the earth's magnetic field, and observing the deviation error of the system on the compass as a measure of the output of the connected valves at each of the simulated angular displacements of the craft.

10. A method of measuring deviation error in a flux valve compass system for maneuverable craft which consists in orienting the flux valve of the system apart from the craft in a direction in the earth's magnetic field according to a known heading of the craft, producing a field that cancels the earth's magnetic field at the oriented valve by connecting a monitoring flux valve to the compass flux valve in electrical opposition to thereby calibrate the compass valve, locating the calibrated valve in its oriented direction on the craft, producing a plurality of directive fields by introducing direct current to the windings of the monitored compass flux valves for each of a plurality of simulated angular displacements of the craft with relation to the earth's magnetic field to swing the craft electrically apart from the influence of the earth's magnetic field, and observing the deviation error of the system on the compass as a measure of the output of the connected valves at each of the simulated angular displacements of the craft.

11. A method of correcting for deviation error in a flux valve compass system for maneuverable craft with a settable deviation compensator which consists in orienting the flux valve of the system apart from the craft in a desired direction in the earth's magnetic field with the compensator set in a non-correcting condition, producing a field that cancels the earth's magnetic field at the oriented valve by connecting a monitoring flux valve to the compass flux valve in electrical opposition to thereby calibrate the compass valve, orienting the craft in the earth's magnetic field to correspond to the orientation of the flux valve, locating the calibrated valve in its oriented direction on the oriented craft, producing a plurality of directive fields by introducing direct current to the windings of the monitored compass flux valves for each of a plurality of simulated angular displacements of the craft with relation to the earth's magnetic field to swing the craft electrically apart from the influence of the earth's magnetic field, observing the deviation error of the system on the compass as a measure of the output of the connected valves at each of the simulated angular displacements of the craft, and setting the deviation compensator in accordance with the observed deviation error.

12. A method of correcting for deviation error in a flux valve compass system for maneuverable craft with a settable deviation compensator which consists in orienting the flux valve of the system apart from the craft in a direction in the earth's magnetic field according to a known heading of the craft with the compensator set in a noncorrecting condition, producing a field that cancels the earth's magnetic field at the oriented valve by connecting a monitoring flux valve to the compass flux valve in electrical opposition to thereby calibrate the compass valve, locating the calibrated valve in the oriented direction on the craft, producing a plurality of directive fields by introducing direct current to the windings of the monitored compass flux valves for each of a plurality of simulated angular displacements of the craft with relation to the earth's magnetic field to swing the craft electrically apart from the influence of the earth's magnetic field, observing the deviation error of the system on the compass as a measure of the output of the connected valves at each of the simulated angular displacements of the craft, and setting the deviation compensator in accordance with the observed deviation error.

References Cited in the file of this patent
UNITED STATES PATENTS

| | | |
|---|---|---|
| 2,887,872 | Halpern et al. | May 26, 1959 |
| 2,887,873 | Halpern et al. | May 26, 1959 |